Dec. 26, 1939.　　　M. DANKO　　　2,184,583
FISHING ROD HOLDER
Filed April 25, 1938
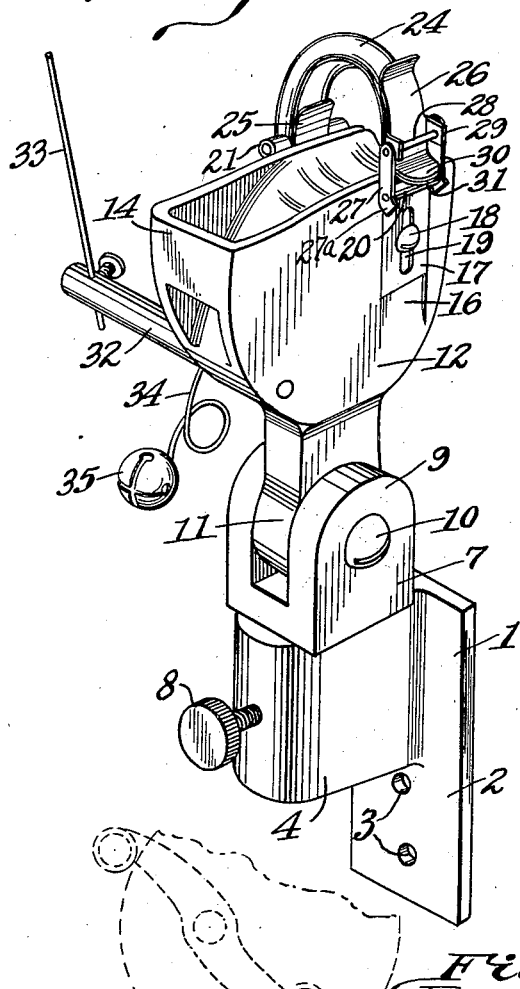
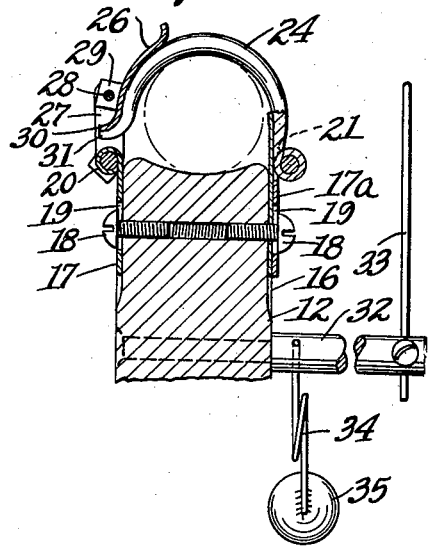
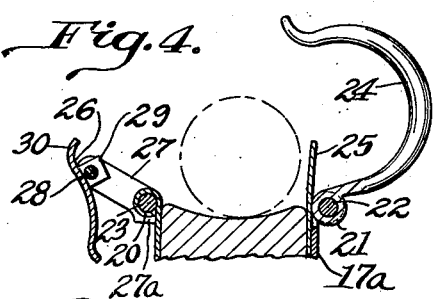
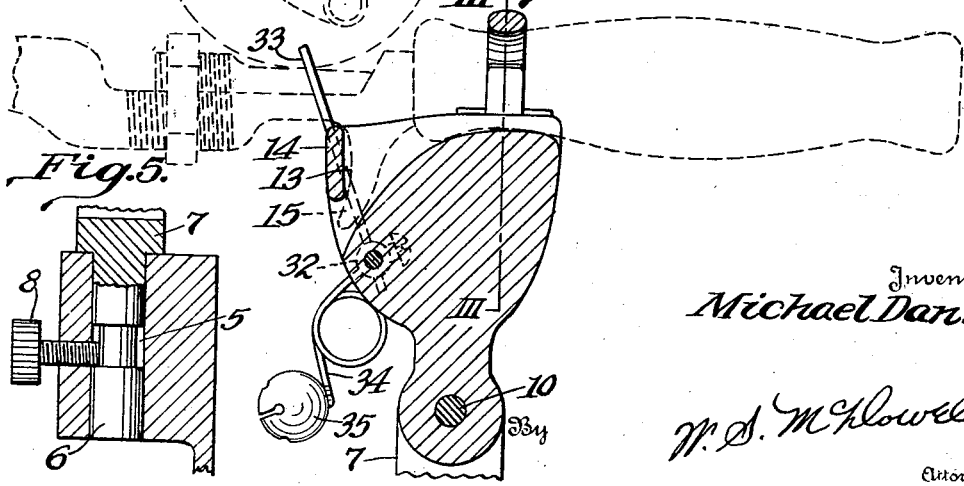
Inventor
Michael Danko Patented Dec. 26, 1939

2,184,583

UNITED STATES PATENT OFFICE 2,184,583

FISHING ROD HOLDER

Michael Danko, Millfield, Ohio

Application April 25, 1938, Serial No. 204,001

5 Claims. (Cl. 248—42)

This invention relates to fishing rod holders and is particularly directed to a holder which may be attached to the side of a boat and will hold a fishing rod in a position extending over the edge of the boat.

The primary object of the invention resides in the provision of a fishing rod holder which will securely hold a fishing rod and may be operated to release the rod with the same hand that is to hold the rod.

A further object of the invention resides in forming the fishing rod holder with means to prevent turning movement as well as longitudinal movement of the rod.

A still further object of the invention resides in the provision of a fishing rod holder having an audible signal arranged to be actuated by the movement of the crank on a reel carried by the rod positioned in the holder.

A still further object resides in the provision of a body and an arcuate clamp to secure the fishing rod to the body and a novel clip to hold the clamp in a rod engaging position.

Further objects will be apparent from the following description and the accompanying drawing in which is shown a fishing rod holder formed in accordance with the present invention.

In the drawing:

Fig. 1 is a perspective view of a fishing rod holder formed in accordance with the present invention;

Fig. 2 is a vertical longitudinal sectional view through the holder shown in Fig. 1 with the hand grip of a fishing rod shown in dotted lines therein;

Fig. 3 is a vertical transverse sectional view taken on the plane indicated by the line III—III of Fig. 2;

Fig. 4 is a view similar to Fig. 3 showing the clamping member in a rod releasing position;

Fig. 5 is a vertical sectional view taken through the bracket employed in securing the rod holder to a support.

Referring more particularly to the drawing, the numeral 1 designates a bracket member used to secure the fishing rod holder to a suitable support. This bracket includes a plate 2 provided at its lower ends with a plurality of spaced openings 3 for the reception of screws or other devices to hold the plate in connection with a support. Adjacent the upper end of the plate, there is provided a laterally extending boss 4 having a vertical opening 5 formed therein. A reduced shank 6 formed at the lower end of a clevis member 7 is positioned in the opening 5 and a set screw 8 extends through the side wall of the boss 4 and engages the shank 6 to hold the same in position in the opening 5.

In registration with the screw 8, the shank is formed with an annular recess to provide for turning movement of the shank in the opening. The screw 8 engages the lower shoulder formed by the recess to prevent the undesired removal of the shank from the opening 5. The clevis 7 is provided at its upper ends with spaced ears 9 having an opening therein for the reception of a screw or bolt 10. Positioned between the ears is a similarly shaped ear 11 formed on the lower end of the holder body 12. The ear 11 is also provided with an opening through which the bolt 10 extends to secure the body 12 in connection with the member 7.

By reason of the connection between the members 12 and 7, the former may be moved in a vertical plane about the axis of the bolt 10. The body 12 is enlarged at its upper end and has the upper surface thereof provided with a longitudinally extending transversely curved depression to receive the rounded handle portion of a fishing rod. At the forward end of the upper surface, a recess 13 is provided, the front wall of the body 12 extending across the recess, as indicated at 14, to form an abutment. When the fishing rod is positioned in the holder, as indicated in Fig. 2, a finger grip 15 usually provided in connection with these holders is positioned in the recess 13 and through the provision of the abutment 14, longitudinal movement of the rod will be precluded. Rotative movement of the rod will also be prevented due to the positioning of the finger grip in the recess 13.

To secure the rod in connection with the body 12, the latter is provided on each side near the rear portion thereof with a pair of registering guides 16 in which is adjustably positioned a pair of plates 17 and 17a, the latter being held in connection with the body 12 by means of machine screws 18. The openings in the plates through which the screws 18 pass are slotted as at 19 to provide for the vertical adjustment of the plates. At the upper edges, the plates are rolled as shown at 20 and 21 to provide openings for the reception of pins 22 and 23. The rolled portion 21 is relieved at the center to receive the looped end of a hook-like ring segment 24. The pin 22 extends through the loop on the member 24 and pivotally secures it in connection with the plate 17a. This construction provides for the swinging movement of the ring segment over the upper end of the body 12. A flat leaf spring 25 is positioned between the plate 17a and the body 12 and extends above the upper edge of the latter to engage the inner surface of the ring segment when it is swung to a position overlying the upper end of the body. This spring operates to swing the ring segment from the active position over the body to an inactive position at one side thereof.

When the fishing rod handle is positioned on the holder, the ring segment is swung over it to hold the handle in connection with the holder. To prevent the ring segment from moving to an inactive position in response to the spring 25, a clip 26 is provided at the opposite side of the body. This clip includes a pair of spaced links 27 pivotally secured to the plate 17 by the pin 23. A pin 28 extends between the free ends of the links 27 to form the pivotal support of the clip 26. This latter member is constructed of sheet metal and includes a pair of apertured ears 29 through which the pin 28 extends. The ears 29 are formed intermediately of the ends of the clip 26 and one end of the latter is curved as at 30 to fit a similarly curved laterally extending projection 31 formed on the free end of the ring segment 24. When the curved end 30 of the clip is engaged with the projection 31 and the clip is swung about the axis of the pin 28 to a position indicated in Fig. 3, the ring segment will be securely locked in engagement with the handle of the fishing rod positioned on the holder. When it is desired to release the fishing rod, the operator grasps the handle and, with the thumb of the hand gripping the handle, swings the longer end of the clip 26 outward away from the ring segment 24. This operation will release the ring segment and the spring 25 will swing it to an inactive position where the rod will be released.

The body 12 is also provided with a transversely extending opening in which is positioned the reduced end of a bar 32, the latter being rotatable in the opening formed in the body. At the outer end, the bar is provided with an upstanding pin 33, the outer end of which is positioned in the path of movement of a crank formed on the reel carried by the fishing rod. Also secured to the rod is a spring wire 34, to the outer end of which is secured a bell 35. When the reel operating crank rotates it will strike the outer end of the pin 33, causing the bar to rock and shake the bell 35. This signal is particularly desirable when fishing after dark as it will inform the fisherman when he has a strike.

The lower end of the link 27 includes an outwardly directed extension 27a which engages the member 12 to limit the downward movement of the clip when it is inactively positioned, as shown in Fig. 4.

The holder illustrated is compact and easy to use. It will not get out of order quickly and will give continued service without requiring the replacement of any parts. If it is desired to use the holder for shore fishing, the lower end of the plate may be provided with a sharpened extension which may be inserted into the ground to hold the device in an elevated position.

While I have shown and described the invention in its preferred form, I do not wish to be limited to the specific construction disclosed but rather by the scope of the following claims.

What is claimed is:

1. A fishing rod holder comprising a body provided with a socket in the upper surface at the forward end thereof, a hook-like ring segment pivoted at one side of said body, spring means for moving the ring segment to an inactive position, a clip positioned on the opposite side of said body, said clip engaging the free end of said ring segment to hold it in active rod holding position, and means for securing the body in connection with a support.

2. A fishing rod holder comprising a body provided with a socket in the upper surface at the forward end thereof, a hook-like ring segment pivoted at one side of said body, a flat leaf spring positioned between said ring segment and said body, a clip positioned on the opposite side of said body, said clip engaging the free end of said ring segment to hold it in active rod holding position, and means for securing the body in connection with a support.

3. A fishing rod holder comprising a body provided with a socket in the upper surface at the forward end thereof, plates secured for vertical adjustment at the sides of said body, a ring segment pivoted at one end to the upper end of one of said plates, the opposite end of said ring segment being provided with a laterally extending projection, a pair of spaced links pivoted at one end to the other plate, a clip member pivoted intermediately of its ends between the free ends of said links, one end of said clip being formed for engagement with the laterally extending projection on said ring segment to hold it in active rod holding position, and means for securing the body in connection with a support.

4. A fishing rod holder comprising a body having a longitudinally grooved upper surface, the depth of the groove at the forward portion of said body being increased to provide a socket, a wall extending transversely of said body to form an abutment at the forward end of the groove, registering guide means on opposite sides of said body adjacent the rear thereof, plate members adjustably secured in connection with said guide means, a hook member pivotally supported at one end by one plate, link means pivoted at one end to the other plate, a clip pivotally supported intermediately of its ends by the free end of said link means, one end of said clip being formed for engagement with the free end of said hook member to hold it in a rod holding position, and means for mounting said body on a support.

5. A fishing rod holder comprising a body having a longitudinally grooved upper surface, the depth of the groove at the forward portion of said body being increased to provide a socket, a wall extending transversely of said body to form an abutment at the forward end of the groove, registering guide means on opposite sides of said body adjacent the rear thereof, plate members adjustably secured in connection with said guide means, a hook member pivotally supported at one end by one plate, link means pivoted at one end to the other plate, motion limiting means provided on said link means, a clip pivotally supported intermediately of its ends by the free end of said link means, one end of said clip being formed for engagement with the free end of said hook member to hold it in a rod holding position, and means for mounting said body on a support.

MICHAEL DANKO.